United States Patent [19]

Stayner

[11] 3,895,973
[45] July 22, 1975

[54] ACTIVATED SOLDERING FLUX
[75] Inventor: Robert A. Stayner, Lafayette, Calif.
[73] Assignee: Chevron Research Company, San Francisco, Calif
[22] Filed: Dec. 17, 1973
[21] Appl. No.: 425,673

[52] U.S. Cl. .................. 148/25; 29/495; 117/134; 148/23; 260/501.16
[51] Int. Cl. ............................................. C23c 1/12
[58] Field of Search .......... 148/23, 25; 260/501.16; 29/495

[56] References Cited
UNITED STATES PATENTS

| | | | |
|---|---|---|---|
| 2,199,397 | 5/1940 | Engelmann | 260/501.16 X |
| 2,554,972 | 5/1951 | Alquist et al. | 250/501.16 X |
| 2,715,084 | 8/1955 | Konig | 148/23 |
| 2,880,125 | 3/1959 | Jordan et al. | 148/23 |
| 3,409,478 | 11/1968 | Condit et al. | 148/23 |
| 3,478,414 | 11/1969 | Potter et al. | 148/23 X |
| 3,535,352 | 10/1970 | Bauman | 250/501.16 X |
| 3,565,926 | 2/1971 | Furey | 260/501.16 X |
| 3,746,620 | 7/1973 | Vance | 148/23 |

Primary Examiner—Allen B. Curtis
Assistant Examiner—Thomas A. Waltz
Attorney, Agent, or Firm—G. F. Magdeburger; C. J. Tonkin; B. G. Fehringer

[57] ABSTRACT

An activated noncorrosive flux composition for low-melting point alloys is provided comprising a fluxing agent and an amine salt of an alpha-bromo-aliphatic carboxylic acid as an activator agent. A method of fluxing an article to be soldered is also provided comprising applying to the surface of the article to be soldered the above flux composition.

22 Claims, No Drawings

ACTIVATED SOLDERING FLUX

BACKGROUND OF THE INVENTION

1. Field of the Invention

This invention relates to fluxes for low-melting point alloys and to methods for using such fluxes. The fluxes of this invention are particularly well suited for use with such low-melting point alloys as the lead-tin alloys used to solder copper. It is particularly well suited for use in wave soldering machines where the surface to be soldered is first contacted with a foam of the flux composition followed by a wave of liquid solder.

Fluxes for low-melting point alloys have long been known. Their primary purpose is to clean the metal and prepare it for deposition of the soldering alloy.

Two general types of soldering fluxes are available. These are the acid fluxes and the rosin fluxes. The precision and sensitivity of modern-day electronics using printed circuits prohibits using highly active but corrosive acid fluxes containing an activator agent such as zinc chloride. Accordingly, the so-called "rosin fluxes" containing an activating agent which is not corrosive to the copper and other materials with which it comes in contact subsequent to the soldering operation must be used.

The activating agent of the rosin flux must be one which is highly active at soldering temperatures but which is quite stable and therefore noncorrosive at the normal operating temperatures of the soldered piece.

As modern electronics equipment becomes more and more sophisticated and is used under a variety of severe conditions, specifications for soldering fluxes become more and more stringent. This is particularly true of equipment which is intended for use by the military or in space. Specifications have been established such as MIL-F-14256D. This specification requires that the activator agent of the flux not be significantly extracted by water; be noncorrosive to copper, enable the solder to spread well across the work piece, etc. Of course it must also be highly active at the soldering temperatures in order to properly prepare the metal.

DESCRIPTION OF THE PRIOR ART

A variety of flux compositions for low-melting point alloys have been described. One such flux is described in Chmelik et al, U.S. Pat. No. 3,305,406 as containing a minor portion of a high molecular weight carboxylic acid whose hydrocarbon chain is interrupted by an amido methyl group and a major proportion of a vehicle selected from chlorinated hydrocarbons, alcohols, these materials diluted with water and mixtures of these diluted materials.

Activated soldering fluxes containing a phenacyl halide or derivatives thereof as an activating agent have been described in Schneider et al, U.S. Pat. No. 3,577,284.

SUMMARY OF THE INVENTION

In one embodiment of the invention, a flux composition is provided for low-melting point alloys comprising a fluxing agent and an amine salt of an alphabromo-aliphatic carboxylic acid as an activator agent. In another embodiment of this invention, a method is provided for fluxing an article to be soldered comprising applying to the surface of the article to be soldered a flux composition described above.

DETAILED DESCRIPTION OF THE INVENTION

The flux compositions of this invention comprise a fluxing agent and an effective amount of an activator agent.

As used herein and in the appended claims, the term "fluxing agent" means a composition comprised of a flux, a solvent for the flux, and other components of the fluxing composition exclusive of the activator agent. In addition to the flux and the solvent for the flux, the fluxing agent often contains supplementary materials such as a foam stabilizer. The activator agent is described in more detail hereinbelow.

THE FLUX

Fluxes suitable for use in the flux compositions of this invention include a number of commonly available materials such as gum rosins, wood rosins, and tall oil rosins. Fluxes which meet various governmental specifications such as military specification MIL-F-I-4256D issued Apr. 17, 1972 include rosins conforming to Class A, Type I, Grade WW or WG of Federal Specification LLL-R-626. Fluxes which meet this very stringent military specification are preferred for use in this invention. A highly suitable and preferred flux is gum rosin, water white grade.

THE FLUX SOLVENT

Suitable solvents for the flux used in this invention include many materials which dissolve or plasticize the flux. Such materials include chlorinated hydrocarbon solvents such as methylene chloride, chloroform, carbon tetrachloride, ethylene dichloride, ethylene trichloride, and the like. Other suitable solvents include low molecular weight alcohols such as methanol, ethanol, propyl alcohol, isopropyl alcohol, butyl alcohol, isobutyl alcohol, and the like. These solvents may be used alone or in mixtures and may be diluted with water. To meet the military specification mentioned above, the solvent must be nonchlorinated. Accordingly, the preferred solvent for the flux used in the fluxing compositions of this invention are the low molecular weight alcohols described above.

OTHER MATERIALS

The flux compositions of the invention can include various additives such as foaming stabilizers. Foam stabilizers are included in fluxes intended for wave soldering machines to stabilize the foam which forms at the surface of flux composition. The foam is formed by aspirating a gas into the flux bath. The foam rather than the liquid flux is what generally contacts the surfaces to be soldered in a wave soldering machine. Accordingly, it is highly desirable to have a relatively stable foam.

Suitable foam stabilizers include materials compatible with the other ingredients of the composition and which have a suitably high film strength. Suitable materials include hydrocarbyl polyols such as glycerine and the alkylene glycols, particularly those containing between 2 and 8 carbon atoms, preferably between 4 and 8 carbon atoms. Examples of suitable alkylene glycols include ethylene glycol, propylene glycol, butylene glycol, pentalene glycol, hexalene glycol, heptalene glycol, and octalene glycol. Preferably the foam stabilizer is hexalene glycol.

THE ACTIVATOR AGENT

The flux compositions of this invention include an activator agent to improve the fluxing capabilities of the fluxing agent. The activator agent is a material which improves the ability of the fluxing agent to clean the surface to be soldered and prepare it to receive the solder. Preferably the activator agent becomes highly active at elevated temperatures, for example, at or slightly below the soldering temperature. However, the activator agent should be substantially passive and nonlabile at the normal operating temperatures of the equipment manufactured from the pieces which are to be soldered. For example, in the military specification set forth above, the flux composition containing the activator agent should be substantially noncorrosive to a thin copper film for 24 hours at a temperature of 23° C in a 50 percent relative humidity environment.

Activator agents which have been found to exhibit the necessary activity at elevated temperatures and yet the required degree of passivity at normal operating temperatures include amine salts of alpha-bromo-aliphatic carboxylic acids. In general, the amine salt can be prepared from any aliphatic carboxylic acid which contains 6 or more carbon atoms and which is substituted in the position alpha to the carboxylic group with a bromine. The amine portion of the amine salt should be a primary or secondary amine containing 6 or more carbon atoms distributed between the amino substituents. The presence of 6 or more carbon atoms in each of the amine and the carboxylic acid moieties of the amine salt insures substantial water insolubility of the activator agent thereby allowing the flux composition to pass the water resistivity test of the above described military specification. The amine salts should be soluble in the fluxing agent at temperatures above about 0°–5°C.

The aliphatic carboxylic acid from which the amine salt is prepared can be obtained from naturally occurring or synthetic sources. Suitable carboxylic acids, as mentioned above, contain 6 or more carbon atoms and generally contain not more than 22 carbon atoms. Examples of suitable acids include hexanoic acid, octanoic acid, decanoic acid, lauric acid, myristic acid, palmitic acid, stearic acid, eicosanoic acid, and docosanoic acid and the like. All the above-mentioned acids are substantially straight chain aliphatic carboxylic acids. Suitable acids also include corresponding aliphatic carboxylic acids containing 1 to 2 sites of olefinic unsaturation such as oleic acid. In addition, saturated and unsaturated branched chain aliphatic carboxylic acids of the requisite carbon content are suitable. For example, a suitable acid includes isostearic acid which is the preferred acid for preparing the activator agents of this invention.

A bromine substituent can be introduced into the alpha position of these carboxylic acids conveniently by the Hell-Volhard-Zelinski reaction. In this well-known reaction, the elemental halogen, in this case bromine, is caused to substitute exclusively at the alpha position of the acid by the presence of a small amount of phosphorus, generally introduced in the form of a phosphorus halide such as phosphorous trichloride or phosphorous tribromide. Subsequent to obtaining the bromine-substituted carboxylic acid, it may be decolorized, if necessary, by contacting it with a suitable material such as activated charcoal or the like. Decolorizing may only be necessary if the specification for the fluxing compositions contains a color requirement.

The amine moiety of the amine salt can be obtained from naturally occurring or synthetic sources. As mentioned above, it should generally contain at least 6 carbon atoms to provide the requisite water insolubility. Suitable amines include dipropylamine, dibutylamine, dihexylamine, octylamine, dioctylamine, N,N-di-(b 2-ethylhexyl)amine, decylamine, di-decylamine, dodecylamine, octadecylamine, dioctadecylamine, and the like. The amino substituents in addition to being saturated as in the examples above can include unsaturated substituents such as in oleylamine and di-oleylamine. Other naturally occurring materials which are suitable include the amino derivatives of coconut oils such as di-cocoamine. The hydrocarbyl portions of the cocoamine derivatives are a mixture of hydrocarbyls, generally straight chain, of which usually 60 percent or more contain 12 to 14 carbon atoms.

The primary and secondary amines used to prepare the amine salts used in the flux compositions of this invention are generally available commercially. The preferred amine to be used in preparing the activator agent of this invention is N,N-di-(2-ethylhexyl)amine.

The amine salt is prepared from the above described amines and the alpha-bromo-aliphatic carboxylic acids by simply combining the two materials either neat or in the presence of a solvent. If the amine salt does not form at room temperature, the mixture may be warmed slightly to cause the salt to form. However, the temperature should be kept below that at which the amide forms as indicated by formation of water. In general, the amine/acid mixture need not be heated above 50°–60°C. To prevent excessive coloration of the amine salt, it is often desirable to use a solvent. Suitable solvents include lower alkanes such as pentane, hexane, heptane, octane and the like as well as the chlorinated hydrocarbons and the lower molecular weight alcohols described above as solvents for the flux. If the solvent used in the flux is not used as the solvent for the amine salt formation reaction, it is often desirable to choose a solvent having a boiling point at about the maximum temperature to which the amine/acid mixture may be brought without formation of the amide. Preferably, the solvent for the formation of the amine salt is the solvent which will be present in the finished fluxing composition.

Preferably, the amine salts used as the activator agent in the flux compositions of this invention have the following formula

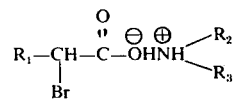

wherein (a) $R_1$ represents a hydrocarbyl containing 4 to 20 carbon atoms, preferably 12 to 18 carbon atoms and 0 to 2, preferably 0 to 1 sites of olefinic unsaturation, and (b) $R_2$ and $R_3$ each independently represent hydrogen or a hydrocarbyl such that the sum of the carbon atoms contained in $R_2$ and $R_3$ is between 6 and 40. Preferably, $R_2$ and $R_3$ each independently represent hydrogen or a hydrocarbyl containing 3 to 16 carbon atoms, preferably 6 to 10 carbon atoms such that the sum of the carbon atoms contained in $R_2$ and $R_3$ is between 6 and 32, preferably between 6 and 20.

PREPARATION OF THE FLUX COMPOSITION

The flux composition of this invention can be prepared by mixing together the ingredients listed above under fluxing agent. The flux, the solvent and the additional components are combined together to form a solution. Thereafter the activator agent is added preferably with agitation until a uniform mixture is obtained. The activator agent is generally present in amounts ranging from about 1 to about 10, preferably from about 1 to about 6 and more preferably from about 2 to about 4 weight percent of the flux composition.

THE METHOD

In another embodiment of this invention, a method is provided for fluxing an article to be soldered which comprises applying to the surface of the article to be soldered a flux composition as described above.

As mentioned above, the flux compositions of this invention are particularly well adapted for use in automatic wave soldering machines. These machines are well known to those skilled in the art of automatic soldering. They usually comprise a set of rails positioned over apparatus which will perform the requisite operations to automatically solder the workpiece. Generally, the workpiece is placed on a carrier on the rails and is first carried over a tray containing the flux composition. The tray generally contains an aspirator through which is introduced small bubbles of a suitable aspirating gas such as air or nitrogen. The aspiration causes foam to form at the surface of the flux composition. The level of this foam is adjusted such that the flux is applied to the surface of the workpiece to be soldered. The flux covers the surface of the workpiece to be soldered. The workpiece is then carried across a preheater which heats the workpiece close to the soldering temperature thereby activating the flux composition and preparing the surface for soldering. The workpiece then travels across a standing wave of liquid solder which is applied to the surface of the workpiece thereby soldering it as required. Following the soldering operation, the workpiece is generally vapor degreased followed by inspection and testing.

The following examples are included to further illustrate the invention.

EXAMPLE 1 - PREPARATION OF ALPHA-BROMO-ISOSTEARIC ACID

A 5 liter, 3 neck flask is equipped with a stirrer nitrogen gas inlet, condensor and thermometer. To the flask is added 2,861 grams (8.696 mols) of isostearic acid. 55 drops of phosphorous trichloride are added and the mixture is stirred for 20 minutes at room temperature under a nitrogen blanket. With stirring, 1,391 grams of liquid bromine are added from a dropping funnel. The rate of addition of the bromine is adjusted to keep the temperature below 40°C. After completing the bromine addition, the reaction mixture is stirred under a nitrogen blanket at room temperature for 17 hours. It was then heated and stirred under a nitrogen blanket at 65° to 72°C for 6 hours. A moderate vacuum was then applied to the reaction mixture which was heated to 120°C over a period of 1½ hours and maintained at this temperature for one-half hour. The product was cooled to room temperature and weighed 3,113 grams.

A portion of the sample was retained for analysis and the remainder was worked up as follows. The reaction product was transferred to a large stainless steel container and 4 gallons of mixed hexanes and 1,000 grams of decolorizing carbon were added. The mixture was stirred at room temperature for 3 hours and then filtered through a filtering aid (Celite 545). The filtrate was dark and was refiltered through a fresh batch of filter aid without improvement in the color. The material was filtered a third time through a different filter aid (Celite 512). The volatiles were then removed by applying a moderate vacuum while heating to a final temperature of 80°C for one-half hour.

The product has an average acid number of 157.5 milligrams of KOH per gram and a bromine content of 11 percent.

By a similar procedure, an alpha-bromo substituent is introduced into stearic acid and hexadecanoic acid.

EXAMPLE 2 - PREPARATION OF AMINE SALT

The amine salt of the alpha-bromo isostearic acid prepared in Example 1 is prepared as follows.

Equimolar parts of the alpha-bromo isostearic acid and di-(ethylhexyl)amine are introduced into a reaction flask equipped with a stirrer, thermometer, and nitrogen gas inlet. The mixture is heated to 50°–52°C with moderate agitation and cooled to room temperature. Formation of the amine salt in the reaction product is verified by analysis.

By a similar procedure, the amine salt of dibutylamine, dihexylamine, di-cocoamine and octylamine with alpha-bromo isostearic acid are prepared. Similarly, the amine salts of 2-ethylhexylamine and octylamine and 2-bromohexadecanoic acid are prepared.

EXAMPLE 3 - PREPARATION AND TESTING OF FLUXING COMPOSITION

A fluxing agent is prepared by combining 35 parts of gum rosin, water white grade, 60 parts of isopropyl alcohol, and 5 parts of hexylene glycol. A flux composition is prepared by adding one of the amine salts shown in the table below to the fluxing agent. In the table, compositions 1–7 contain 4% activator agent and compositions 8–10 contain 2% activator agent. The flux compositions so obtained are tested in accordance with the procedure set forth in military specifications MIL-F-1-4256D. In particular, the flux compositions were tested for the resistivity of the water extract (3.2.5), chlorides and bromides content (3.2.6), spread factor (3.3.2) and effect on copper mirror (3.5).

Resistivity of the water extract is determined by measuring the resistivity of each of 5 beakers of distilled water at 23°C with a conductivity bridge. This resistivity should be not less than 500,000 ohm-cm. After the resistivity measurement, 0.100 cubic centimeters of flux composition is added to each of three of the beakers. All five beakers are then heated to a boil for one minute followed by quick cooling and then reimmersion in a controlled temperature water bath. After thermal equilibrium is reached, the resistivity of the contents of each of the five beakers is again determined. The resistivity of the two control beakers shall not be less than 500,000 ohm-cm and the resistivities of the water extracts of the flux composition is averaged. The mean of these specific resistivities is established by this specification to be not less than 100,000 ohm-cm.

Ionizable chlorides and bromides content is determined by placing one drop of the flux composition on a dry piece of silver chromate test paper. After 15 seconds, the test paper is immersed in clean isopropyl alcohol for 15 seconds to remove the residual organic material. The test paper is dried for 10 minutes and examined for a color change. The above specification establishes that the test paper shall show no chlorides or bromides present by a color change of the paper to off-white or yellow-white.

The spread factor is determined by the following procedure: five 2-inch square coupons are cut from 0.005 inch thick electrolytic copper sheets. The coupons are cleaned with a 10% fluoroboric acid dip. They are then vapor degreased and oxidized for one hour in an electric oven at 150°C. A solder ring is prepared by wrapping ten or more turns of 0.063 inch diameter solder around a mandril. The ring is removed from the mandril and the helix removed by flattening the ring. The diameter of the mandril is chosen to produce a solder ring weighing 0.500 grams plus or minus 0.025 grams. The coupons are placed on a flat oxidized copper sheet and a solder ring is placed in the center of each coupon. 0.10 grams plus or minus the 0.005 grams of flux composition is placed in the center of each ring. The coupons are then placed horizontally in a circulating air oven at 205°C for 6 minutes. At the end of 6 minutes the coupons are removed from the oven and allowed to cool. Excess flux composition residue is removed by washing with alcohol. The height of the solder spot on the coupon is measured to the nearest 0.001 centimeters and the results of the five coupons are averaged. The spread factor is calculated by determining the volume of the solder placed on the coupon. The diameter of an equivalent sphere of the solder is 1.2407 times the cube root of the volume. The spread factor is calculates as: spread factor (%) equals 100 (D-H)/D wherein D equals the diameter of the equivalent sphere and H equals the height of the solder spot as determined above. The spread factor established by the above military specification is 80% minimum.

The effect on a copper mirror is determined as follows: a copper mirror consisting of a vacuum-deposited film of pure copper metal on one surface of a flat sheet of clear polished glass is used. The thickness of the copper film is uniform and shall permit 10 percent plus or minus 5 percent transmission of normal incident light of 5,000 angstroms. Immediately prior to use, the copper mirrors are immersed in a 5 percent solution of ethylene diamine tetraacetic acid, rinsed thoroughly in water, immersed in clean ethyl or methyl alcohol and dried with clean oil-free air. Approximately 0.05 milliliters of flux composition and 0.05 milliliters of a control-standard flux composition are placed adjacent to each other on the face of the mirror. The mirror is placed in a horizontal position at 23°C and 50 percent relative humidity in a dust-free cabinet for 24 hours. At the end of the 24 hours the flux compositions are removed by immersing the mirror in clean isopropyl alcohol and visually examining to determine if there has been any complete removal of the copper film. Discoloration of the copper or only partial reduction of the thickness of the copper film do not yield a fail rating. The control-standard flux composition used in this test is 35 percent weight rosin, water white grade, dissolved in reagent grade 99 percent isopropyl alcohol.

The results of testing the flux compositions described above and containing the various activator agents are shown in the table.

TABLE

| | Activator-Salt of: | acid:amine mole ratio | Resistivity ohm-cm | Halide Content | Spread Factor | Copper Mirror |
|---|---|---|---|---|---|---|
| 1. | 2-bromoisostearic acid and di-(2-ethylhexyl)amine | 1:1 | 300,000 | Pass | 87 | Pass |
| 2. | 2-bromoisostearic acid and di-(2-ethylhexyl)amine | 1.5:1 | 410,000 | Pass | 84 | Pass |
| 3. | 2-bromoisostearic acid and di-(2-ethylhexyl)amine | 1:1.5 | 195,000 | Pass | 79 | Pass |
| 4. | 2-bromoisostearic acid and dihexyl amine | 1:1 | 305,000 | Pass | 84 | Pass |
| 5. | 2-bromoisostearic acid and dihexyl amine | 1.5:1 | 510,000 | Pass | 87 | Pass |
| 6. | 2-bromoisostearic acid and dibutyl amine | 1:1 | 490,000 | Pass | 85 | Pass |
| 7. | 2-bromoisostearic acid and di-cocoamine | 1:1 | 119,000 | Pass | 87 | Pass |
| 8. | 2-bromoisostearic acid and octyl amine | 1:1 | 300,000 | Pass | 80 | Pass |
| 9. | 2-bromohexadecanoic acid and 2-ethylhexyl amine | 1:1 | 380,000 | Pass | 84 | Pass |
| 10. | 2-bromo hexadecanoic acid and octylamine | 1:1 | 235,000 | Pass | 89 | Pass |

The results presented in the table show the flux compositions of this invention pass the tests of the very stringent military specification MIL-F-l-14256D except for the spread factor of composition number 3.

What is claimed is:

1. A flux composition for low-melting point alloys comprising a rosin and an amount effective to improve the ability of said rosin to clean a surface to be soldered and to prepare said surface to receive solder of an activator agent comprising an amine salt of an alpha-bromo-aliphatic carboxylic acid, wherein said amine salt has the following formula

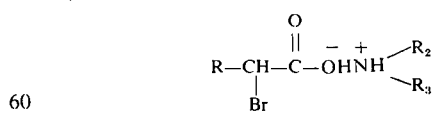

wherein (a) $R_1$ represents a hydrocarbyl containing 4 to 20 carbon atoms and 0 to 2 sites of olefinic unsaturation, and (b) $R_2$ and $R_3$ each independently represent hydrogen or a hydrocarbyl, in which the sum of the carbon atoms contained in $R_2$ and $R_3$ is between 6 and 40 to insure substantial water insolubility of said activator agent.

2. A flux composition of claim 1 wherein: (a) $R_1$ represents a hydrocarbyl containing 12 to 18 carbon atoms and 0 to 1 site of olefinic unsaturation, and (b) $R_2$ and $R_3$ each independently represent hydrogen or a hydrocarbyl containing 3 to 16 carbon atoms.

3. A flux composition of claim 2 wherein $R_2$ and $R_3$ each independently represent a hydrocarbyl containing 3 to 16 carbon atoms.

4. A flux composition of claim 2 wherein $R_2$ and $R_3$ each independently represent a hydrocarbyl containing 6 to 10 carbon atoms.

5. A flux composition of claim 2 wherein $R_2$ and $R_3$ each represent 2-ethylhexyl.

6. A flux composition of claim 2 wherein $R_2$ and $R_3$ each represent hexyl.

7. A flux composition of claim 2 wherein $R_2$ and $R_3$ each represent octyl.

8. A flux composition of claim 1 wherein said fluxing agent comprises 25 to 45 percent weight gum rosin, 50 to 70 percent weight of a C2–C6 alcohol, and 1 to 10 percent weight of a C2–C8 alkylene glycol.

9. A flux composition of claim 2 wherein said fluxing agent comprises 25 to 45 percent weight gum rosin, 50 to 70 percent weight of a C2–C6 alcohol, and 1 to 10 percent weight of a C2–C8 alkylene glycol.

10. A flux composition of claim 4 wherein said fluxing agent comprises 25 to 45 percent weight gum rosin, 50 to 70 percent weight of a C2–C6 alcohol, and 1 to 10 percent weight of a C2–C8 alkylene glycol.

11. A flux composition of claim 5 wherein said fluxing agent comprises 30 to 40 percent weight gum rosin, 55 to 65 percent weight of a C2–C4 alcohol and 3 to 7 percent weight of a C4–C8 alkylene glycol.

12. A flux composition of claim 5 wherein said fluxing agent comprises 30 to 40 percent gum rosin, 55 to 65 percent weight of isopropyl alcohol and 3 to 17 percent weight of hexylene glycol.

13. A method of fluxing an article to be soldered comprising applying to the surface of the article to be soldered a flux composition of claim 1.

14. A method of fluxing an article to be soldered comprising applying to the surface of the article to be soldered a flux composition of claim 2.

15. A method of fluxing an article to be soldered comprising applying to the surface of the article to be soldered a flux composition of claim 4.

16. A method of fluxing an article to be soldered comprising applying to the surface of the article to be soldered a flux composition of claim 5.

17. A method of fluxing an article to be soldered comprising applying to the surface of the article to be soldered a flux composition of claim 6.

18. A method of fluxing an article to be soldered comprising applying to the surface of the article to be soldered a flux composition of claim 7.

19. A method of fluxing an article to be soldered comprising applying to the surface of the article to be soldered a flux composition of claim 8.

20. A method of fluxing an article to be soldered comprising applying to the surface of the article to be soldered a flux composition of claim 12.

21. A flux composition for low-melting point alloys comprising a rosin and an amount effective to improve the ability of said rosin to clean a surface to be soldered and to prepare said surface to receive solder of an activator agent comprising a primary or secondary hydrocarbyl amine salt of an alpha-bromo-hydrocarbyl carboxylic acid wherein said amine contains 6 to 40 carbon atoms to insure substantial water insolubility of said activator agent and the hydrocarbyl group of said acid contains 5 to 21 carbon atoms.

22. A method of fluxing an article to be soldered comprising applying to the surface of the article to be soldered a flux composition comprising a rosin and an amount effective to improve the ability of said rosin to clean a surface to be soldered and to prepare said surface to receive solder of an activator agent comprising a primary or secondary hydrocarbyl amine salt of an alpha-bromo-hydrocarbyl carboxylic acid wherein said amine contains 6 to 40 carbon atoms and the hydrocarbyl group of said acid contains 5 to 21 carbon atoms.

* * * * *

UNITED STATES PATENT AND TRADEMARK OFFICE
CERTIFICATE OF CORRECTION

PATENT NO. : 3,895,973
DATED : July 22, 1975
INVENTOR(S) : Robert A. Stayner

It is certified that error appears in the above-identified patent and that said Letters Patent are hereby corrected as shown below:

Column 4, line 8, "N,N-di-(h" should read --N,N-di-(--

Column 6, line 44, "specifications" should read --specification--

Column 8, line 56, the formula should read

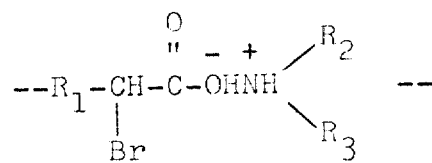

Column 9, line 36, "3 to 17 per-" should read --3 to 7 per- --.

Signed and Sealed this fourteenth Day of October 1975

[SEAL]

Attest:

RUTH C. MASON
Attesting Officer

C. MARSHALL DANN
Commissioner of Patents and Trademarks